United States Patent

Stark et al.

[11] Patent Number: 5,997,088
[45] Date of Patent: Dec. 7, 1999

[54] VEHICLE SEAT

[75] Inventors: Rudolf Stark, Munich; Helmut Diehl, Kochel; Peter Gadner, München, all of Germany

[73] Assignee: Bayerische Motoren Werke Aktiengesellschaft, Munich, Germany

[21] Appl. No.: 08/971,721

[22] Filed: Nov. 17, 1997

[30] Foreign Application Priority Data

Nov. 16, 1996 [DE] Germany .......................... 196 47 464

[51] Int. Cl.[6] .............................. B60N 2/30; B60N 2/32
[52] U.S. Cl. .............................. 297/354.13; 297/215.12; 297/195.12; 297/215.1; 297/215.11; 297/243
[58] Field of Search ..................... 297/354.13, 195.12, 297/215.1, 215.12, 215.11, 243; 180/219

[56] References Cited

U.S. PATENT DOCUMENTS

| | | | |
|---|---|---|---|
| 3,549,172 | 12/1970 | McBroom | 297/215.12 X |
| 3,822,917 | 7/1974 | George | 297/215.12 |
| 3,887,231 | 6/1975 | Bochynsky | 297/215.12 X |
| 3,913,974 | 10/1975 | Bowen | 297/215.12 X |
| 4,506,754 | 3/1985 | Hirano et al. | |
| 4,679,647 | 7/1987 | Komuro | 297/243 X |
| 4,953,911 | 9/1990 | Hanagan | 297/215.12 |
| 5,261,725 | 11/1993 | Rudolph | 297/354.13 X |

Primary Examiner—Peter M. Cuomo
Assistant Examiner—Rodney B. White
Attorney, Agent, or Firm—Evenson, McKeown, Edwards & Lenahan, P.L.L.C.

[57] ABSTRACT

A vehicle seat, especially for single-track vehicles such as motorcycles, etc. The vehicle seat has a backrest that serves as a true backrest in its upright position and serves as an extra seat in a folded position. According to the invention, the tilt of the backrest can adjusted when it is in the upright position. This is accomplished by an adjusting shaft with an eccentric pin. The adjusting shaft also secures the backrest in its folded position.

22 Claims, 3 Drawing Sheets

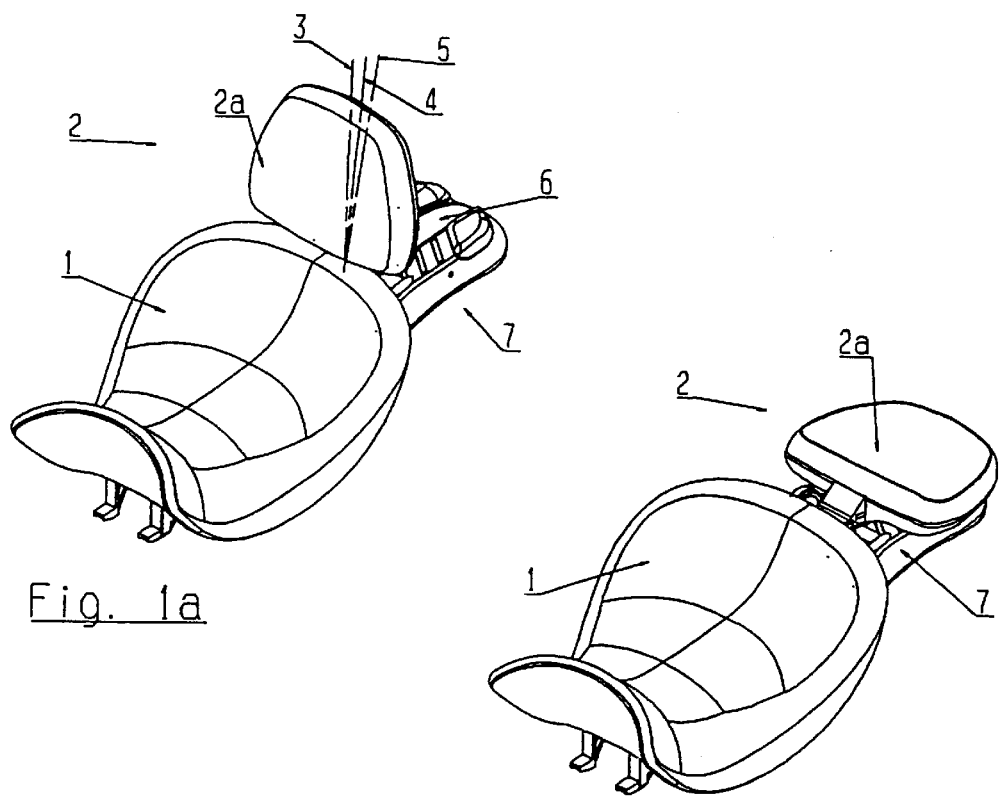
Fig. 1a
Fig. 1b
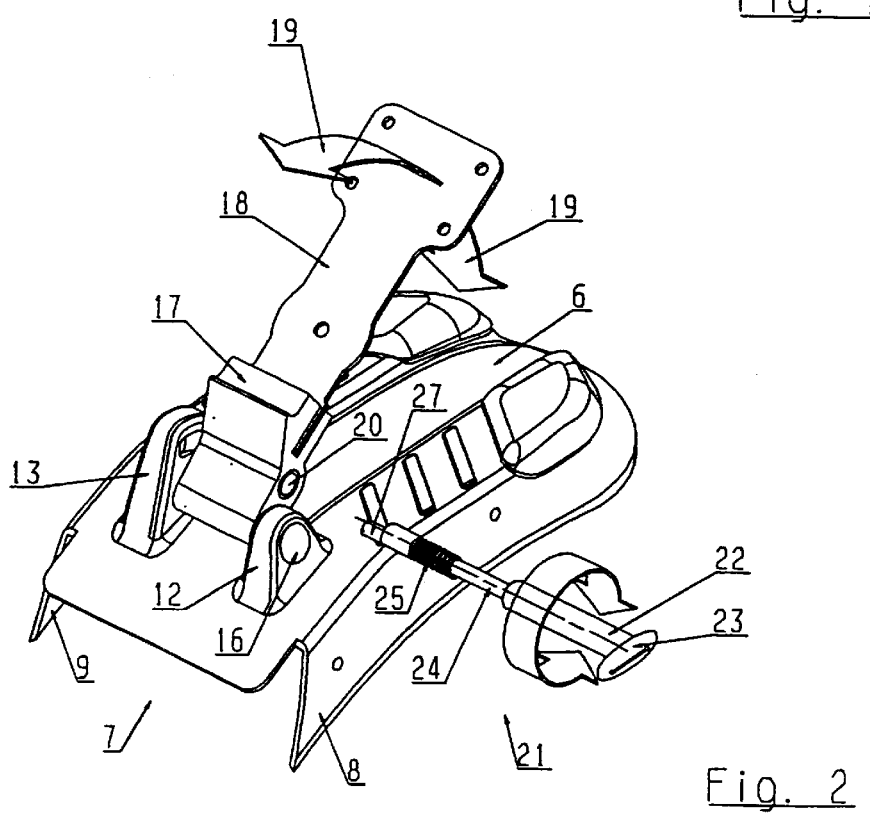
Fig. 2

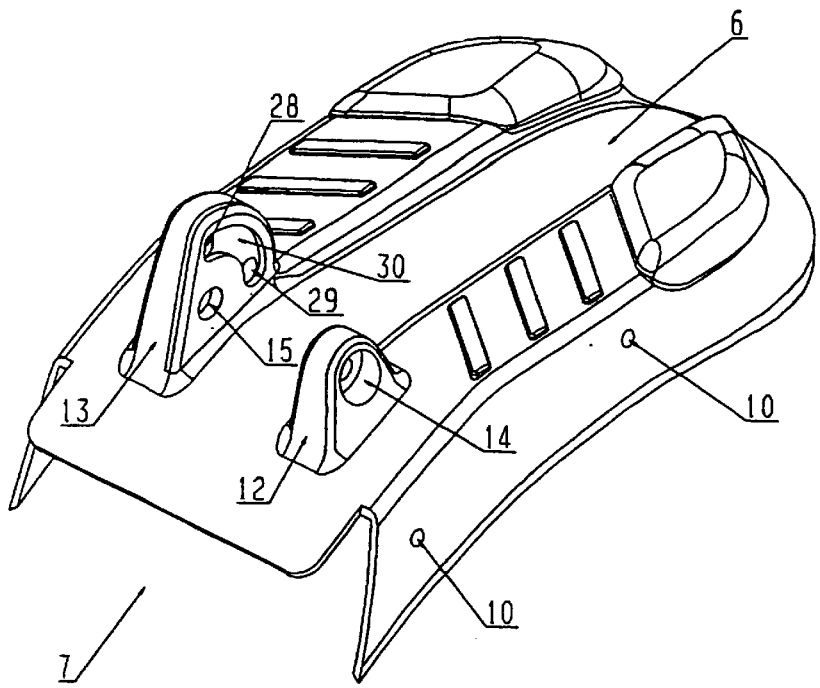
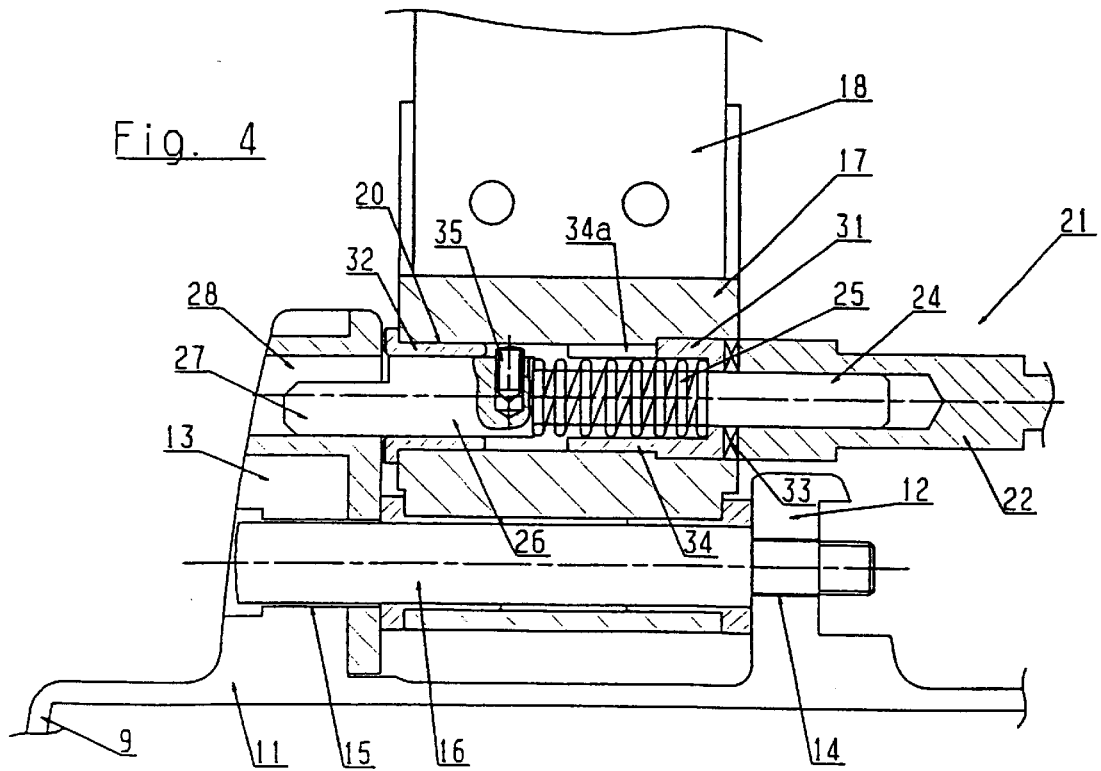

VEHICLE SEAT

BACKGROUND AND SUMMARY OF THE INVENTION

This application claims the priority of German application 196 47 464.7, the disclosure of which is expressly incorporated by reference herein.

The invention relates to a vehicle seat, especially for single-track vehicles, for example motorcycles.

A vehicle seat for a motorcycle is known from U.S. Pat. No. 4,506,754. In this design, the seat, footrests, and possibly the handlebars of the motorcycle can be adjusted to the body size of the individual rider. The seat can be shifted lengthwise of the vehicle. In addition, it has a tiltable backrest that serves as an extra seat when folded down. The backrest can assume either an upright position in which it serves as a backrest, or the above mentioned folded-down position; no intermediate positions are expressly mentioned.

The previously known design allows adjustment within a broad range, but the individual adjustment mechanisms are designed in a relatively cumbersome fashion. With the large number of adjustment possibilities, moreover, there is the risk that the rider will not find his desired position or that it will take a long period of time to make the adjustments.

A goal of the invention is to design a vehicle seat that can be easily adjusted and will fit the different body sizes of riders, at least within acceptable limits, as well as being comfortable.

These and other goals have been achieved according to the present invention a vehicle seat for a single-track vehicle comprising: a seat; and a folding backrest operatively coupled to said seat via a rotary joint such that said backrest is pivotable from an upright position for use as a backrest into a lowered position for use as an extra seat, and such that said backrest is adjustable to a plurality of angles of inclination in said upright position.

These and other goals have also been achieved according to the present invention by providing a mounting structure for a vehicle seat of a single-track vehicle, comprising: a support part to be secured to the single-track vehicle; first and second bearings extending upwardly from rear support part, each of said bearings defining a respective mounting bore aligned on a first axis; a bearing section to be coupled to said vehicle seat, said bearing section being rotatably coupled to said first and second bearings via said respective mounting bores, said bearing section defining an adjusting bore extending therethrough essentially parallel to said first axis; an adjusting shaft extending through said adjusting bore, said adjusting shaft comprising a first portion engaged with said bearing section and rotatable about a second axis essentially parallel to said first axis, said adjusting shaft further comprising a pin extending axially from said adjusting bore and arranged eccentrically with respect to said second axis, said pin being selectively engageable with an elongate hole and a locking bore defined in said first bearing, said pin locking said bearing section in a lowered position when engaged with said locking bore, and said adjusting shaft being rotatable when said pin is engaged with said elongate hole to adjust an angle of inclination of said bearing section about said first axis of rotation.

It has been found that the rider tries to achieve a comfortable position on a vehicle by tilting his upper body more or less backward depending on his body size. This discovery is utilized by the invention in that, in contrast to the prior art, it makes only the backrest adjustable in terms of its tilt. Adjustability is not absolutely necessary for the other parts, namely the footrests and handlebars.

In a preferred embodiment of the invention, the adjustment mechanism has an adjusting shaft that is rotatably mounted in a portion of the backrest and engages a rear supporting part fastened to the body of the vehicle via an eccentric component. The rear supporting part simultaneously serves to pivotably mount the backrest.

When the adjusting shaft is turned, the eccentric component of the backrest forces the different inclinations to be assumed, while it is supported in a corresponding bore in the rear supporting part. In order to provide the operator with distinct adjustment positions, it is also advantageous to permit the tilt adjustment to be performed in fixed stages. This is accomplished by notched marks in which the adjusting shaft is secured by spring force.

In one advantageous embodiment of the invention, the adjusting shaft makes it possible, in addition to adjusting the tilt, to fold down the backrest as well. It then secures the backrest in the folded position. In this manner, all of the possible adjusting functions of the backrest are combined for the most part into one component.

It has also been found that under certain circumstances, a backrest that has been optimally adjusted tiltwise can be perceived as uncomfortable, especially on a long trip. In one advantageous embodiment of the invention therefore, the backrest is made flexible by spring action within preset limits at each of its tilted positions. This is accomplished in simple fashion by a leaf spring that connects the actual cushion of the backrest with its bearing or adjusting section.

Other objects, advantages and novel features of the present invention will become apparent from the following detailed description of the invention when considered in conjunction with the accompanying drawings.

BRIEF DESCRIPTION OF THE DRAWINGS

FIG. 1a is a perspective view of a vehicle seat according to a preferred embodiment of the present invention with the backrest raised;

FIG. 1b is a perspective view of the vehicle seat of FIG. 1 with the backrest folded and serving as an extra seat;

FIG. 2 is an enlarged perspective view of the adjusting mechanism for the backrest of FIGS. 1–2;

FIG. 3 is a detailed view of the rear part of the adjusting mechanism shown in FIG. 2;

FIG. 4 is an enlarged sectional view through the bearing and adjustment mechanism of FIG. 2.

DETAILED DESCRIPTION OF THE DRAWINGS

Figure 3A:
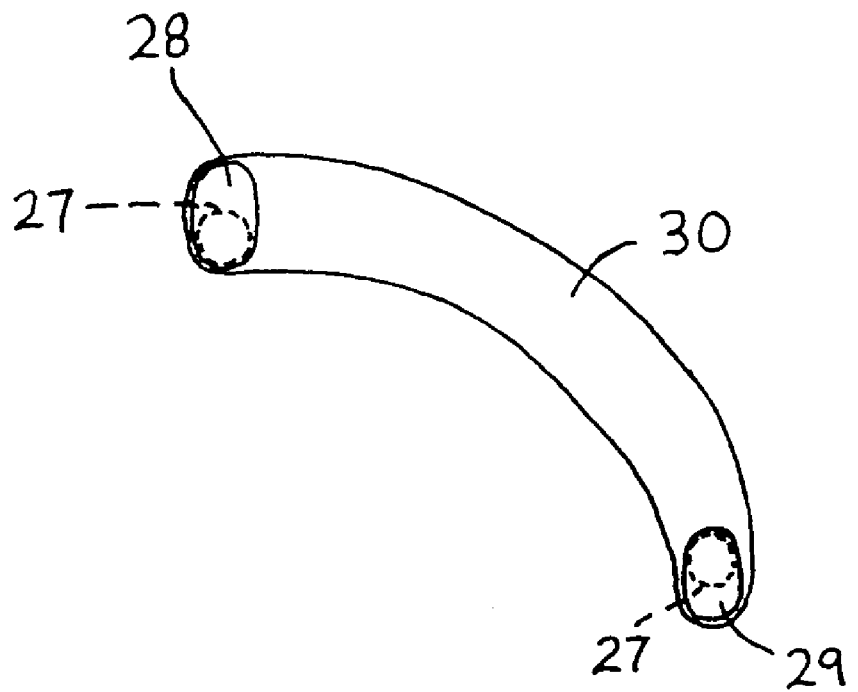
FIG. 3a is a lateral view in the area of the guide groove in FIG. 3.

A vehicle seat according to FIG. 1 has a seat cushion 1 and a backrest 2. The vehicle seat belongs to a motorcycle, not shown, in this case a so-called "chopper"; accordingly, seat 1 has a shape that resembles a saddle. Backrest 2, designed for the most part as cushion 2a for comfort reasons, assumes an upright position in FIG. 1a and serves as a backrest for a motorcycle rider, likewise not shown. In this position the backrest can tilt in several stages, and the individual positions are indicated by dot-dashed lines 3, 4 and 5.

In FIG. 1b, backrest 2 is folded down and thus, by virtue of the adjustment mechanism described below, lies on the rear part 6 of a rear supporting part 7 of the vehicle body, not shown in greater detail, without rattling.

The parts that allow adjustment and folding of the backrest 2 are shown in FIGS. 2 and 3. The entire rear support part 7 can be seen, fastened by legs 8, 9 with screw connections (via screw holes 10 shown in FIG. 3) to a motorcycle frame, not shown. The two legs are connected together by a base section 11 that runs perpendicularly to them. At its top, two projecting bearings 12 and 13 are formed on base section 11, said bearings extending in approximately the same direction as, but in the opposite direction from, legs 8 and 9 (i.e., in approximately parallel planes). In addition, they are displaced slightly further from the central portion of base section 11.

A bearing shaft 16 is held nonrotatably in bores 14 and 15 of bearing 12 and 13. Bearing shaft 16 is part of a rotary joint for pivoting the backrest. Accordingly, a bearing section 17 of backrest 2 rests on bearing shaft 16 between bearings 12, 13 and is free to rotate. Leaf spring 18 fastened to bearing section 17 is coupled to cushion 2a (FIG. 1) of the backrest, said spring permitting flexible yielding of backrest 2. The spring movements are limited by stops not shown in detail. A double arrow 19 in FIG. 2 shows the pivotability of the backrest into the upright and folded positions as shown in FIGS. 1a and 1b.

The tilt adjustment mechanism of the backrest follows from FIGS. 2 to 4. A through bore 20, which is shown in FIG. 4 as stepped, passes through bearing section 17 of the backrest, aligned approximately parallel to bearing shaft 16. An adjusting shaft designated as a whole by 21 can be inserted into through bore 20, said shaft consisting of two partial sections. A first partial section 22, when the adjusting shaft is in place, is located outside through bore 20. At its end facing away from bearing section 17 it has a knob 23 that allows the rider to turn adjusting shaft 21 by hand and without using any additional tools.

At the other end, in partial section 22, another partial section of the adjusting shaft with a smaller diameter is inserted together with one end of a shaft section 24, whose part extending from partial section 22 projects into through bore 20. A compression spring 25 is displaced over a certain length range along this shaft section 24. Compression spring 25 is inside bore 20 when adjusting shaft 21 has been installed.

Shaft section 24 merges with another shaft section 26 which finally terminates in an eccentric pin 27. This eccentric pin 27, in the assembled state and with the backrest upright, engages an elongate hole 28 (FIG. 3, 3a) in bearing 13. Elongate hole 28 is then aligned in the vertical direction of the vehicle, in other words in a direction approximately perpendicular to the path of rear support part 7 (see also FIG. 4). Its length is slightly greater than the diameter of the central part of shaft section 26, while the width of elongate hole 28 corresponds to the diameter of eccentric pin 27. Pin 27 can then rotate in elongate hole 28.

When the backrest is folded down, eccentric pin 27 engages a locking bore 29 of bearing 13. The locking bore in turn is an elongate hole aligned perpendicularly, and pin 27 is then located at the upper end of the elongate hole, as shown in FIG. 3a. This provides assurance that when this extra seat is subjected to a load by a pillion rider, no unnecessary forces act on pin 27. A guide groove 30 is located between elongate hole 28 and locking bore 29.

The rotatable mounting of adjusting shaft 21 is accomplished essentially by means of a bearing bushing 32 fastened in through bore 20. A latching bushing 31 is likewise fastened therein and can also serve partially as a bearing for the adjusting shaft. For its primary function, latching bushing 31 has four contact bevels 33 distributed in the circumferential direction on its face that is directed toward shaft section 22, with bevels 33 extending in the axial direction of adjusting shaft 21. At the end area facing latching bushing 31, contact bevels 33 are also machined in shaft section 22 and match the bevels on latching bushing 31.

On its side facing away from the contact bevels, latching bushing 31 serves as a counterbearing for compression spring 25. The other end of compression spring 25 abuts the step projection between the different diameters of shaft sections 24 and 26. Finally the latching bushing, in its portion that faces away from the contact bevel, makes a transition to a hollow cylindrical extension 34 that has a groove 34a extending axially and open on one side. The width of groove 34a is chosen so that a worm 35 mounted on the circumference of shaft section 26 can be introduced by its projecting head portion.

The adjustment mechanism operates as follows. With the backrest upright, as already explained, pin 27 engages elongate hole 28. As adjusting shaft 21 is turned, the pin can move along the length of elongate hole 28, i.e., vertically. The pin 27 cannot move perpendicularly to said hole, i.e. horizontally, because the width of elongate hole 28 is the same as its diameter. As a result, adjusting shaft 21 compels the backrest to assume a tilted position by virtue of the eccentricity of pin 27.

As a result of contact bevels 33 sliding on one another, the adjusting shaft is moved axially away from through bore 20 when it is turned against the restoring force of compression spring 25. As soon as knob 23 is released, compression spring 25 again forces adjusting shaft 21 axially in the direction of the through bore into a stable position determined by the shape of the contact bevel. Since four contact bevels are provided, distributed around the circumference, there are four possible adjustments. However, two of these adjustments produce the same tilt of the backrest, namely in those positions in which pin 27 is at the upper or lower end of elongate hole 28.

To fold down backrest 2, adjusting shaft 21 is pulled out against the force of compression spring 25 until pin 27 disengages from elongate hole 28. The backrest can then be folded down. When knob 23 is released, the compression spring urges pin 27 into locking bore 29. This secures the backrest in this position.

In order to prevent the backrest from lying loosely on the rear part in this position and causing rattling noises, it is advisable to permit folding only in a very specific rotational position of adjusting shaft 21. This is achieved by groove 34a and the head section of worm 35. Only in this rotational position can the head section enter the groove and thus permit adjusting shaft 21 to be pulled out sufficiently far. In all other rotational positions, the head section abuts the face of bushing 34, so that it is not possible to move pin 27 out of elongate hole 28.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle seat for a single-track vehicle, comprising:
   a seat; and
   a folding backrest operatively coupled to said seat via a rotary joint such that said backrest is pivotable from an upright position for use as a backrest into a lowered position for use as an extra seat, and such that said backrest is adjustable to a plurality of angles of inclination in said upright position, wherein the rotary joint comprises a rear support part to be secured to the single-track vehicle, and at least two bearings projecting upwardly from said rear support part, said bearings defining respective bores to receive a bearing shaft coupled to the backrest, and an adjusting mechanism provided on the backrest cooperating with one of the bearings, wherein the adjusting mechanism comprises an adjusting shaft extending approximately parallel to said bearing shaft, said adjusting shaft being rotatably coupled to the backrest via an eccentrically located pin, said pin engaging an elongate hole defined in said one of the bearings and abutting a wall defining said elongate hole when the backrest is under a load.

2. A vehicle seat according to claim 1, wherein the backrest is adjustable to said plurality of angles of inclination by turning the adjusting shaft, wherein said adjusting shaft is secured in a selected one of said angles of inclination via latching engagements.

3. A vehicle seat according to claim 2, wherein the latching engagements are formed as contact bevels in the backrest which are engaged by corresponding contact bevels on the adjusting shaft, said contact bevels arranged to slide on one another during rotation in order to shift the adjusting shaft axially against a spring force.

4. A vehicle seat according to claim 1, wherein said adjusting shaft is movable outward axially away from said one of the bearings to move said eccentric pin out of said elongate hole against a spring force, in order to allow the backrest to be moved into said lowered position.

5. A vehicle seat according to claim 4, wherein said eccentric pin is movable out of said elongate hole only when the adjusting shaft is in a fixed rotational position.

6. A vehicle seat according to claim 5, wherein said adjusting shaft is surrounded by a hollow cylindrical extension of a latching sleeve located inside said backrest and is rotatably secured therein, and wherein the hollow cylindrical extension defines a groove that extends axially and is open on one side, said groove receiving a stop projecting radially on said adjusting shaft.

7. A vehicle seat according to claim 1, wherein said eccentric pin engages a locking bore defined in said one of the bearings when the backrest is in said lowered position.

8. A vehicle seat according to claim 1, wherein the backrest is secured to flexibly move within preset limits in each of said angles of inclination.

9. A vehicle seat according to claim 8, wherein the backrest is pivotably mounted in said rear support part via a bearing section, said bearing section receiving said adjusting shaft, said bearing section being connected via a leaf spring with a cushion of the backrest.

10. A vehicle seat according to claim 9, wherein the leaf spring is flexibly movable and is limited by end stops.

11. A mounting structure for a vehicle seat of a single-track vehicle, comprising;
   a support part to be secured to the single-track vehicle;
   first and second bearings extending upwardly from said support part, each of said bearings defining a respective mounting bore aligned on a first axis;
   a bearing section to be coupled to said vehicle seat, said bearing section being rotatably coupled to said first and second bearings via said respective mounting bores, said bearing section defining an adjusting bore extending therethrough essentially parallel to said first axis;
   an adjusting shaft extending through said adjusting bore, said adjusting shaft comprising a first portion engaged with said bearing section and rotatable about a second axis essentially parallel to said first axis, said adjusting shaft further comprising a pin extending axially from said adjusting bore and arranged eccentrically with respect to said second axis,
   said pin being selectively engageable with each one of (a) an elongate hole and (b) a locking bore, said elongate hole and said locking bore being defined in said first bearing, said pin locking said bearing section in a lowered position when engaged with said locking bore, and said adjusting shaft being rotatable when said pin is engaged with said elongate hole to adjust an angle of inclination of said bearing section about said first axis.

12. A mounting structure according to claim 11, wherein said elongated hole has a longitudinal course which extends generally vertically.

13. A mounting structure according to claim 12, wherein a longitudinal length of said elongated hole is at least as great as a diameter of a central portion of said adjusting shaft located adjacent said pin, and a width of said elongate hole is essentially equal to a diameter of said pin.

14. A mounting structure according to claim 11, wherein said adjusting shaft is axially movably disposed in said adjusting bore such that said pin is disengageable from each one of (a) said elongate hole and (b) said locking bore via axial movement of said adjusting shaft to permit movement of said bearing section between an upright position and said lowered position.

15. A vehicle seat for a single-track vehicle, comprising:
   a seat; and
   a folding backrest operatively coupled to said seat via a rotary joint such that said backrest is pivotable from an upright position for use as a backrest into a lowered position for use as an extra seat, said rotary joint comprising an adjusting shaft which is rotatable to adjust said backrest to a plurality of angles of inclination in said upright position,
   wherein the rotary joint further comprises a rear support part to be secured to the single-track vehicle, and at least two bearings projecting upwardly from said rear support part, said bearings defining respective bores to receive a bearing shaft coupled to the backrest, said adjusting shaft being engageable with one of the bearings, wherein said one of the bearings defines an elongate hole and a locking bore, said adjusting shaft being selectively engageable with said elongate hole to lock the seat in said upright position, and said adjusting shaft being selectively engageable with said locking bore to lock the seat in said lowered position.

16. A vehicle seat according to claim 15, wherein said adjusting shaft is manually engageable by a rider of the single-track vehicle to rotate the adjusting shaft to adjust said backrest.

17. A vehicle seat according to claim 15, wherein said adjusting shaft is rotatably disposed in an adjusting bore defined in a bearing section coupled to said seat, said adjusting bore defining an axis.

18. A vehicle seat according to claim 17, wherein said adjusting shaft includes an axially extending pin arranged eccentrically with respect to said axis, and wherein said adjusting shaft is selectively engageable with each one of (a) said elongate hole and (b) said locking bore via said pin.

19. A vehicle seat according to claim 18, wherein said adjusting shaft is axially movably disposed in said adjusting bore such that said pin is disengageable from each one of (a)

said elongate hole and (b) said locking bore via axial movement of said adjusting shaft to permit movement of said seat between said upright and said lowered positions.

20. A mounting structure for a vehicle seat of a single-track vehicle, comprising:

a support part to be coupled to the single-track vehicle;

first and second bearings extending from said support part;

a bearing section to be coupled to said vehicle seat, said bearing section being rotatably coupled to said first and second bearings about a first axis, said bearing section defining an adjusting bore extending therethrough along a second axis; and an adjusting shaft rotatably disposed in said adjusting bore, said adjusting shaft including a pin extending axially from said adjusting bore and arranged eccentrically with respect to said second axis, said pin being selectively engageable with an elongate hole defined in said first bearing such that rotation of said adjusting shaft adjusts an angle of inclination of said bearing section about said first axis.

21. A mounting structure according to claim 20, further comprising a locking bore defined in said first bearing at an angle from said elongate hole about said first axis, said pin being selectively engageable with said locking bore.

22. A mounting structure according to claim 21, wherein said adjusting shaft is axially movably disposed in said adjusting bore such that said pin is disengageable from each of (a) said elongate hole and (b) said locking bore via axial movement of said adjusting shaft to permit movement of said bearing section between upright and lowered positions.

* * * * *